(12) United States Patent
Yoshimura et al.

(10) Patent No.: US 8,584,086 B2
(45) Date of Patent: Nov. 12, 2013

(54) SOFTWARE REUSE SUPPORT METHOD AND APPARATUS

(75) Inventors: Kentaro Yoshimura, Hitachi (JP); Fumio Narisawa, Hitachinaka (JP); Yoshitaka Atarashi, Hitachinaka (JP); Hiroto Sasaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 706 days.

(21) Appl. No.: 12/762,905

(22) Filed: Apr. 19, 2010

(65) Prior Publication Data

US 2010/0269099 A1 Oct. 21, 2010

(30) Foreign Application Priority Data

Apr. 20, 2009 (JP) ................................. 2009-102014

(51) Int. Cl.
*G06F 9/44* (2006.01)

(52) U.S. Cl.
USPC ........... 717/120; 717/104; 717/108; 717/121; 717/122

(58) Field of Classification Search
None
See application file for complete search history.

(56) References Cited

U.S. PATENT DOCUMENTS

| | | | | |
|---|---|---|---|---|
| 7,032,219 | B2* | 4/2006 | Mowers et al. | 717/172 |
| 7,353,496 | B2* | 4/2008 | Kimura et al. | 717/121 |
| 8,495,569 | B2* | 7/2013 | Yoshimura et al. | 717/120 |
| 2002/0066075 | A1* | 5/2002 | Mowers et al. | 717/107 |
| 2002/0069400 | A1* | 6/2002 | Miloushev et al. | 717/108 |
| 2002/0194578 | A1* | 12/2002 | Irie et al. | 717/122 |
| 2004/0133879 | A1* | 7/2004 | Yoshimura et al. | 717/120 |
| 2004/0172612 | A1* | 9/2004 | Kasravi et al. | 717/101 |
| 2006/0117306 | A1* | 6/2006 | Kimura et al. | 717/141 |
| 2006/0123415 | A1* | 6/2006 | Dandekar et al. | 717/177 |
| 2007/0294670 | A1 | 12/2007 | Hisaki | |
| 2008/0040705 | A1* | 2/2008 | Jeong | 717/122 |
| 2008/0126881 | A1* | 5/2008 | Bruckhaus | 714/47 |
| 2008/0263506 | A1* | 10/2008 | Broadfoot et al. | 717/104 |
| 2010/0115492 | A1* | 5/2010 | Yoshimura et al. | 717/120 |
| 2010/0228693 | A1* | 9/2010 | Dawson et al. | 706/12 |

FOREIGN PATENT DOCUMENTS

| | | |
|---|---|---|
| JP | 8-147152 A | 6/1996 |
| JP | 10-63494 A | 3/1998 |

OTHER PUBLICATIONS

David Harper, Fido Helps Explain Bayers' Formula, Feb. 2007, 4 pages, <http://www.bionicturtle.com/how-to/article/fido_helps_explain_bayesformula/>.*

Ruben Prieto-Diaz, Classifying software for reusability, 1987 IEEE, pp. 6-16, <http://ieeexplore.ieee.org/stamp/stamp.jsp?tp=&arnumber=1695670>.*

(Continued)

*Primary Examiner* — Thuy Dao
*Assistant Examiner* — Cuong V Luu
(74) *Attorney, Agent, or Firm* — Crowell & Moring LLP

(57) ABSTRACT

A likelihood indicating the distribution of the frequency of use of each specification of the existing device is calculated for each version of a software component used in the control software of the existing device, and a prior probability indicating the distribution of the frequency of use of each version is calculated for each software component used in the control software of the existing device. A posterior probability indicating the reusability of each version of the existing software component is calculated for each specification of a device to be developed, on the basis of the likelihood and the prior probability.

20 Claims, 14 Drawing Sheets

(56) References Cited

OTHER PUBLICATIONS

Roger S. Pressman, Software Engineering a Practitioner's Approach, 1992 Guideforengineers, 67 pages, <http://guideforengineers.com/wordpress/wp-content/uploads/2009/10/se_notes.pdf>.*

On Batory et al., The Design and Implementation of Hierarchical Software Systems with Reusable Components, 1992 ACM, pp. 355-398, <http://dl.acm.org/citation.cfm?id=136587>.*

Gianluigi Caldiera et al., Identifying and Qualifying Reusable Software Components, 1991 IEEE, pp. 61-70, <http://ieeexplore.ieee.org/stamp/stamp.jsp?tp=&arnumber=67210>.*

Victor R. Basili, Viewing Maintenance as Reuseoriented Software Development, 1990 IEEE, pp. 19-25, <http://ieeexplore.ieee.org/stamp/stamp.jsp?tp=&arnumber=43045>.*

T. Ravichandran et al., Software Reuse Strategies and Component Markets, 2003 ACM, pp. 109-114, <http://dl.acm.org/citation.cfm?id=859678>.*

Rossak W R Ed—Institute of Electrical and Electronics Engineers:"Software development reusing existing components". Proceedings of the Annual International Phoenix Conference on Computers and Communications. Scottsdale. Mar. 22-24, 1989; [Proceedings of the Annual International Phoenix Conference on Computers and Communications]. Washington. IEEE Comp. Soc. Pres. Mar. 22, 1989. pp. 327-331, XP010015284.

Bernd Hardung et al.: "Reuse of Software in Distributed Embedded Automotive Systems"EMSOFT 2004. 4th. ACM International Conference on Embedded Software. Pisa. Italy. Sep. 27-29. 2004; [International Conference on Embedded Software], New York NY : ACM. US, Sep. 27, 2004. pp. 203-210, XP 007907718.

Vijay Rao D et al: "A rough-fuzzy approach for retrieval of candidate components for software reuse" Pattern Recognition Letters, Elsevier, Amsterdam, NL, vol. 24 No. 6, Mar. 1, 2003 pp. 875-886, XP 004396082.

Beser E et al.: "Reusable Ada avionics software packages library system", Proceedings of the National Aerospace and Electronics Conference. (NAECON) Dayton, May 18-22, 1992; [Proceedings of The National Aerospace and Electronics Conference. (NAECON), N]EW York, IEEE, US, vol. CONF. 44, May 18, 1992 pp. 598-602, XP010064310.

European Search Report dated Dec. 10, 2012 (three (3) pages).

* cited by examiner

FIG. 3

| Specification item \ Device name | Engine control device A | Engine control device B | Engine control device C | Engine control device D | ... | Engine control device Z |
|---|---|---|---|---|---|---|
| Destination | JP | EU | US | US | ... | EU |
| Number of cylinders | 4 | 6 | 4 | 8 | ... | 4 |
| Fuel injection | MPI | DI | MPI | MPI | ... | MPI |
| Transmission | AT | MT | AT | AT | ... | MT |

FIG. 4

| Software component name \ Device name | Engine control device A | Engine control device B | Engine control device C | Engine control device D | ... | Engine control device Z |
|---|---|---|---|---|---|---|
| SWC1 | v 1.0 | v 2.0 | v 1.0 | v 3.0 | ... | v 1.0 |
| SWC2 | v 1.0 | v 1.0 | v 1.0 | v 1.0 | ... | v 2.0 |
| SWC3 | v 1.0 | v 2.0 | v 1.0 | v 3.0 | ... | v 2.0 |

FIG. 5

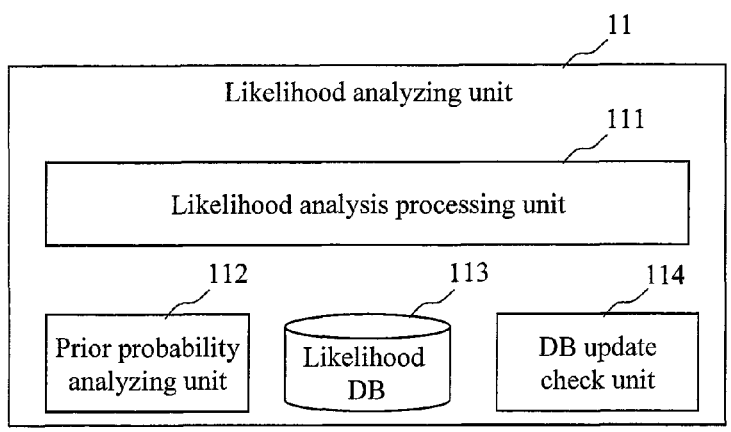

FIG. 7

| Likelihood table of software component SWC1 ||||
|---|---|---|---|
| Version number | Specification: Number of cylinders (Upper side: Record of use of version, Lower side: Likelihood) |||
| | 4 | 6 | 8 |
| v1.0 | 30 (100%) | 0 (0%) | 0 (0%) |
| v2.0 | 0 (0%) | 6 (60%) | 4 (40%) |
| v3.0 | 3 (33%) | 1 (11%) | 5 (56%) |

1131

| Prior probability table of software component SWC1 | | 1132 |
|---|---|---|
| Version number | Record of use of version | |
| | Prior probability | |
| v1.0 | 30 (61%) | |
| v2.0 | 10 (20%) | |
| v3.0 | 9 (18%) | |

FIG. 18

Specification selection screen

| Specification item | Choice | | |
|---|---|---|---|
| Destination | ◎ JP | ○ US | ○ EU |
| Number of cylinders | ○ 4 | ◎ 6 | ○ 8 |
| Fuel injection type | ◎ MPI | ○ DI | |
| Transmission | ○ AT | ○ MT | |

Software component selection screen

| Software component name | ver | Posterior probability |
|---|---|---|
| SWC1 | ◎ Ver 1.0 | 91% |
| | ○ Ver 3.0 | 9% |
| SWC2 | ○ Ver 1.0 | 50% |
| | ○ Ver 2.0 | 50% |
| SWC3 | : | |

311

SOFTWARE REUSE SUPPORT METHOD AND APPARATUS

BACKGROUND OF THE INVENTION

1. Field of the Invention

The present invention relates to a software reuse support technique for supporting the reuse of the existing software when new software is created.

2. Description of the Related Art

For example, in the technical fields of vehicles and mobile phones, a control target is controlled by so-called embedded software. The embedded software has advantages in that it can perform control more flexibly and accurately than the control method according to the related art using a mechanical mechanism or an electric circuit and it is possible to partially change the software to develop many products derived from the software.

In recent years, with the expansion of the application range of the embedded software, the number of derivative products and the size of software have increased. Therefore, it is necessary to significantly increase the efficiency of development and effectively reuse the existing products in the development of derivative products.

The embedded software used in a vehicle engine system is given as an example. The engine meets non-mechanical requirements, such as a destination and emission regulation, as well as mechanical requirements, such as the number of cylinders, engine displacement, a fuel injection type, and an intake control type. These requirements are set as specifications. There are many choices for the specifications. For example, the number of cylinders may be 4, 6, or 8. The existing embedded software is developed so as to correspond to a specific combination of these specifications.

Therefore, it is difficult to use the existing embedded software without any change in order to develop a new embedded software product. It is desired to maximize the reuse of the existing software in order to improve the efficiency of development. For this reason, a software reuse support apparatus for supporting the reuse of the existing software has been proposed.

Japanese Patent Application Laid-Open (JP-A) No. 8-147152 discloses an example of a software reuse support apparatus for reusing the previously created software. The software reuse support apparatus generates a search path for determining the specifications to be reused, on the basis of the relationship between the previous component specifications or a creation history and presents it to the user.

JP-A No. 10-63494 discloses a program component use support system that searches for the reusability of the existing software component. The support system detects the record of use of each existing software component and sets the software component that is frequently used as a candidate with high reusability.

However, the techniques disclosed in JP-A Nos. 8-147152 and 10-63494 are applied to business software, not embedded software. The embedded software is characterized in that it is incorporated into vehicles and apparatuses, such as mobile phones. Therefore, it is necessary to consider the specifications of an apparatus into which the software is incorporated, in addition to the specifications of the software.

SUMMARY OF THE INVENTION

An object of the invention is to provide a technique for supporting the use of the existing software component when control software to be developed is created.

According to an aspect of the invention, a specification database that stores the specifications of the existing device and a software component database that stores software components used in the control software of the existing apparatus and the versions of the software components are used.

According to another aspect of the invention, a likelihood indicating the distribution of the frequency of use of each specification is calculated for each version of a software component on the basis of the specifications of the existing device stored in a specification database and the existing software components and the versions of the existing software components stored in a software component database. In addition, a prior probability indicating the distribution of the frequency of use of each version is calculated for each software component. A posterior probability indicating the reusability of each version of the existing software component is calculated for each specification of a device to be developed, on the basis of the likelihood, the prior probability, and the specifications of the device to be developed.

According to the above-mentioned aspects of the invention, it is possible to support the use of the existing software components when control software to be developed is created.

BRIEF DESCRIPTION OF THE DRAWINGS

FIG. 3 is a diagram illustrating an example of specification data stored in a specification database of the software reuse support apparatus according to the embodiment of the invention;

FIG. 4 is a diagram illustrating an example of software component data stored in a software component database of the software reuse support apparatus according to the embodiment of the invention;

FIG. 5 is a diagram illustrating an example of the structure of a likelihood analyzing unit of a reusable software component search device of the software reuse support apparatus according to the embodiment of the invention;

FIG. 7 is a diagram illustrating an example of the likelihood analysis result of the likelihood analysis processing unit of the likelihood analyzing unit of the software reuse support apparatus according to the embodiment of the invention;

FIG. 18 is a diagram illustrating an example of a specification selection screen of a specification input unit of the software reuse support apparatus according to the embodiment of the invention;

FIG. 19 is a diagram illustrating an example of a software component selection screen of a reusable software component output unit of the software reuse support apparatus according to the embodiment of the invention;

DETAILED DESCRIPTION OF THE PREFERRED EMBODIMENTS

Figure 1:
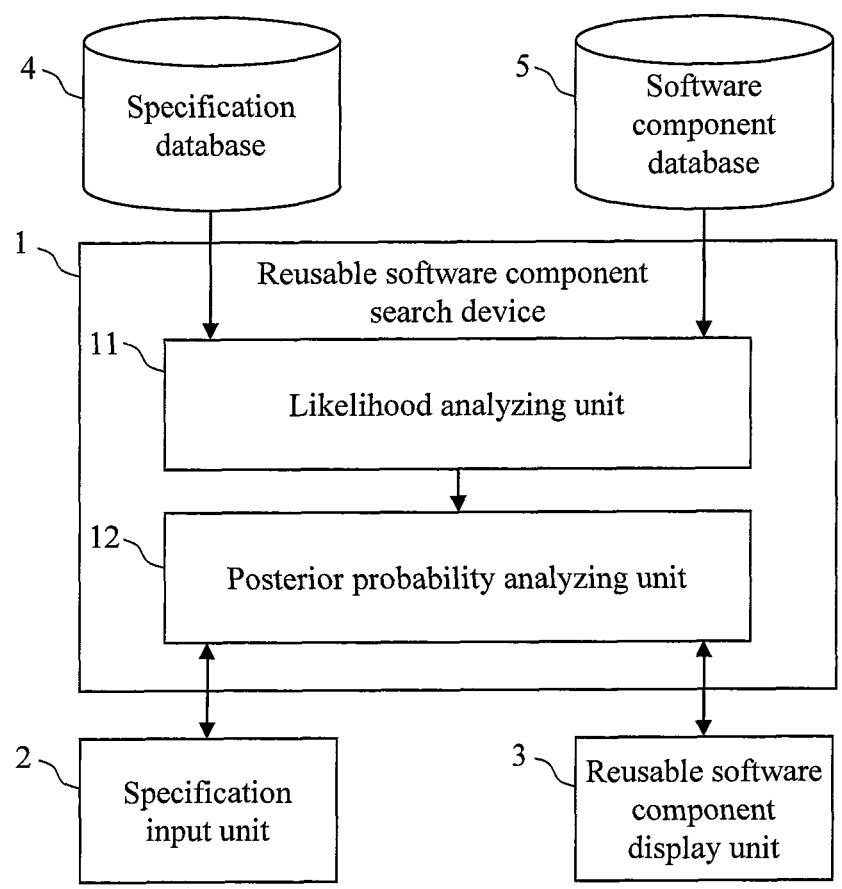
FIG. 1 is a diagram illustrating an example of the structure of a software reuse support apparatus according to an embodiment of the invention.

Hereinafter, a software reuse support apparatus according to an embodiment of the invention will be described with reference to the accompanying drawings. FIG. 1 is a diagram illustrating the outline of an example of the system structure of the software reuse support apparatus according to the embodiment of the invention. As shown in FIG. 1, the software reuse support apparatus according to this embodiment includes a specification database 4, a software component database 5, a reusable software component search device 1 that searches for a reusable software component from the software components stored in the software component database 5, a specification input unit 2 that is used to input the specifications of a device to be newly developed or improved, and a reusable software component display unit 3 that displays the reusability of the existing software component.

The specifications of the existing device are stored in the specification database 4. A software component used in the control software of the existing device and the version of the software component are stored in the software component database 5.

The reusable software component search device 1 includes a likelihood analyzing unit 11 and a posterior probability analyzing unit 12. The likelihood analyzing unit 11 receives the specifications of the existing device from the specification database 4, receives the version information of the software component used in the control software of the existing device from the software component database 5, and calculates the likelihood of the specifications of each existing software component and the prior probability of the version thereof.

The likelihood of the specifications means the frequency distribution of each specification calculated for each version of a predetermined software component in the previous control software. That is, the likelihood means the distribution of the frequency of use of each version of the software component calculated for each specification. The prior probability means the distribution of the frequency of use of each version calculated for each software component in the previous control software.

The posterior probability analyzing unit 12 receives the specifications of a device to be newly developed or improved from the specification input unit 2, receives the likelihood of the specifications of each existing software component and the prior probability of the version thereof from the likelihood analyzing unit 11, and calculates the posterior probability of the existing software component in the control software of the device to be newly developed or improved. The posterior probability means the reusability of each version of the existing software component in the control software of the device to be newly developed or improved. The analysis result is displayed by the reusable software component display unit 3.

According to the software reuse support apparatus of this embodiment, it is possible to quantitatively evaluate the reusability of the existing software component in the control software which is newly developed for a device to be newly developed or improved, on the basis of the likelihood indicating the record of use of the specifications of the device and the prior probability indicating the record of use of the version of the existing software component, in the existing control software.

The hardware of the software reuse support apparatus according to this embodiment of the invention is not particularly described, and may be configured by a general computer. That is, the reusable software component search device 1 is a computer main body or an arithmetic device. The specification input unit 2 and the reusable software component display unit 3 are user interfaces provided by the computer. Specifically, the specification input unit 2 and the reusable software component display unit 3 are an input device, such as a keyboard, and a display device connected to the computer, respectively. The specification database 4 and the software component database 5 may be external storage devices connected to the computer.

Figure 2:
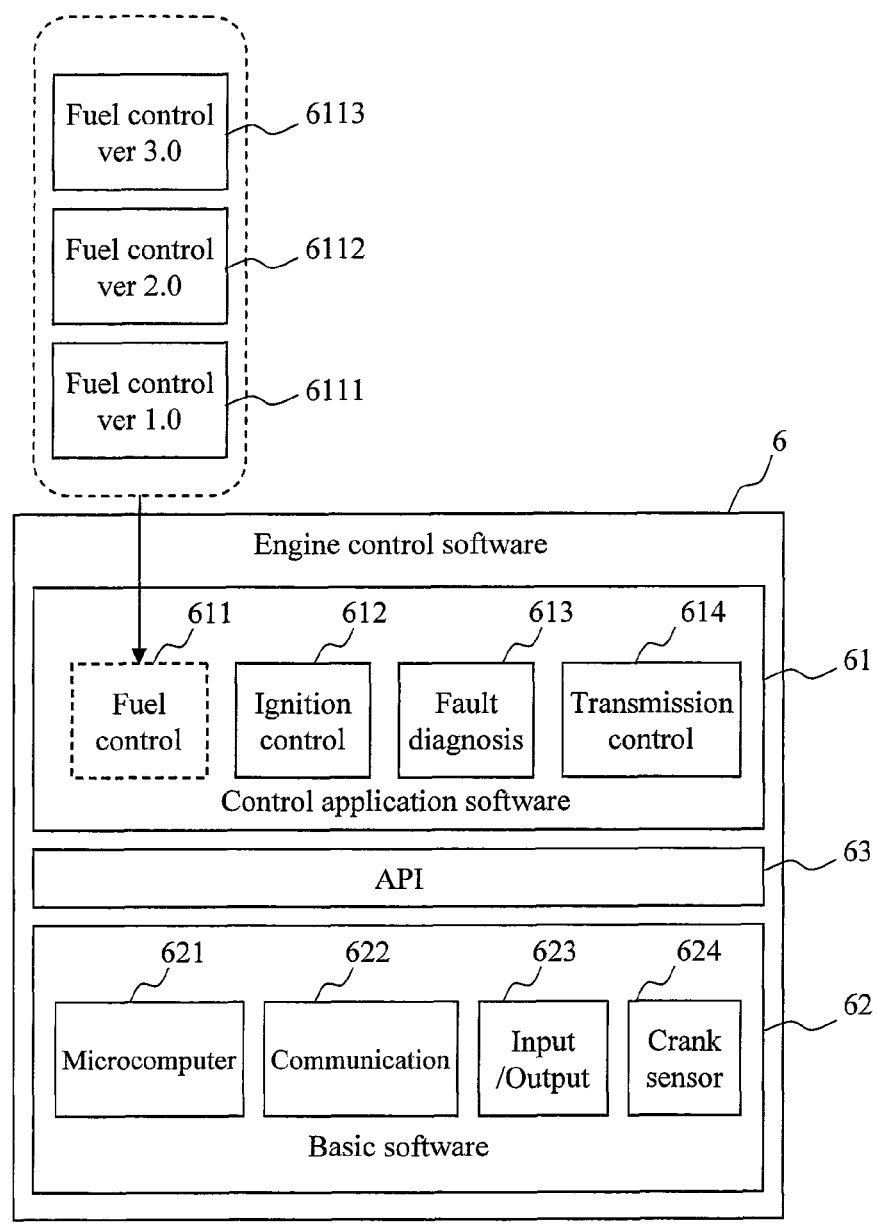
FIG. 2 is a diagram illustrating an example of the structure of engine control software.

FIG. 2 is a diagram illustrating a concrete example of vehicle engine control software 6 that can be applied to the software reuse support apparatus 1 according to this embodiment. The engine control software 6 includes control application software 61, basic software 62, and an application program interface (API) 63. The control application software 61 includes a fuel control software component 611, an ignition control software component 612, a fault diagnosis software component 613, and a transmission control software component 614. The basic software 62 includes a software component 621 for a microcomputer, a software component 622 for communication, a software component 623 for input and output, and a software component 624 for a crank sensor.

The development of control software for an engine control device having specifications different from those of the existing engine control device is considered. It is assumed that engine control software to be newly developed has the same structure as the engine control software 6 shown in FIG. 2. The existing fuel control software component 611 has a fuel control software component Ver1.0 6111, a fuel control software component Ver2.0 6112, and a fuel control software component Ver3.0 6113 as variations. A process of analyzing which of three fuel control software components 6111, 6112, and 6113 is reusable in the engine control software to be newly developed is performed as follows.

FIG. 3 is a diagram illustrating specification data 41 of the existing engine control device stored in the specification database 4 according to this embodiment. The horizontal axis indicates a device name, and the vertical axis indicates a specification item. The specifications selected by the device are written in the field where the horizontal axis indicating the device name and the vertical axis indicating the specification item intersect each other. For example, in an engine control device A, 'JP (Japan)' is selected as a 'specification item: destination' and '4 cylinders' is selected as a 'specification item: the number of cylinders'.

The specifications of the engine control device include conditions related to a mechanical structure, such as the number of cylinders, a fuel injection type, and a transmission, and non-mechanical conditions, such as a destination and exhaust gas regulation. For example, when the engine control devices have the same mechanical structure but the destinations thereof are different from each other, the engine control devices have different specifications. The engine control software depends on the specifications. Therefore, in the following description, the specifications of the device or the specifications of the engine control device may be referred to as the specifications of control software.

FIG. 4 is a diagram illustrating software component data 51 used in the existing control software that is stored in the software component database 5 according to this embodiment. The horizontal axis indicates a device name and the vertical axis indicates a software component name. The variation of the software component used in the control software of the device is written in the field where the horizontal axis indicating the device name and the vertical axis indicating the software component name intersect each other. For example, in the control software of an engine control device B, 'Ver2.0' is selected as a 'software component: SWC1' and 'Ver1.0' is selected as a 'software component: SWC2'.

FIG. 5 is a diagram illustrating an example of the structure of the likelihood analyzing unit 11 according to the embodiment. The likelihood analyzing unit 11 includes a likelihood analysis processing unit 111 that analyzes the likelihood of a software component, a prior probability analyzing unit 112 that analyzes the prior probability of a software component, a likelihood database 113 that stores the analysis result of the likelihood analysis processing unit 111 and the analysis result of the prior probability analyzing unit 112, and a database update check unit 114 that checks whether it is necessary to update the likelihood database 113 and, if necessary, updates the likelihood database 113. The process of the likelihood analysis processing unit 111 will be described with reference to FIG. 6, and the results of the likelihood analysis process are shown in FIG. 7. The process of the prior probability analyzing unit 112 will be described with reference to FIG. 8, and the results of the prior probability analysis process are shown in FIG. 9. An example of the likelihood database 113 will be described with reference to FIG. 13. The process of the database update check unit 114 will be described with reference to FIG. 10.

Figure 6:
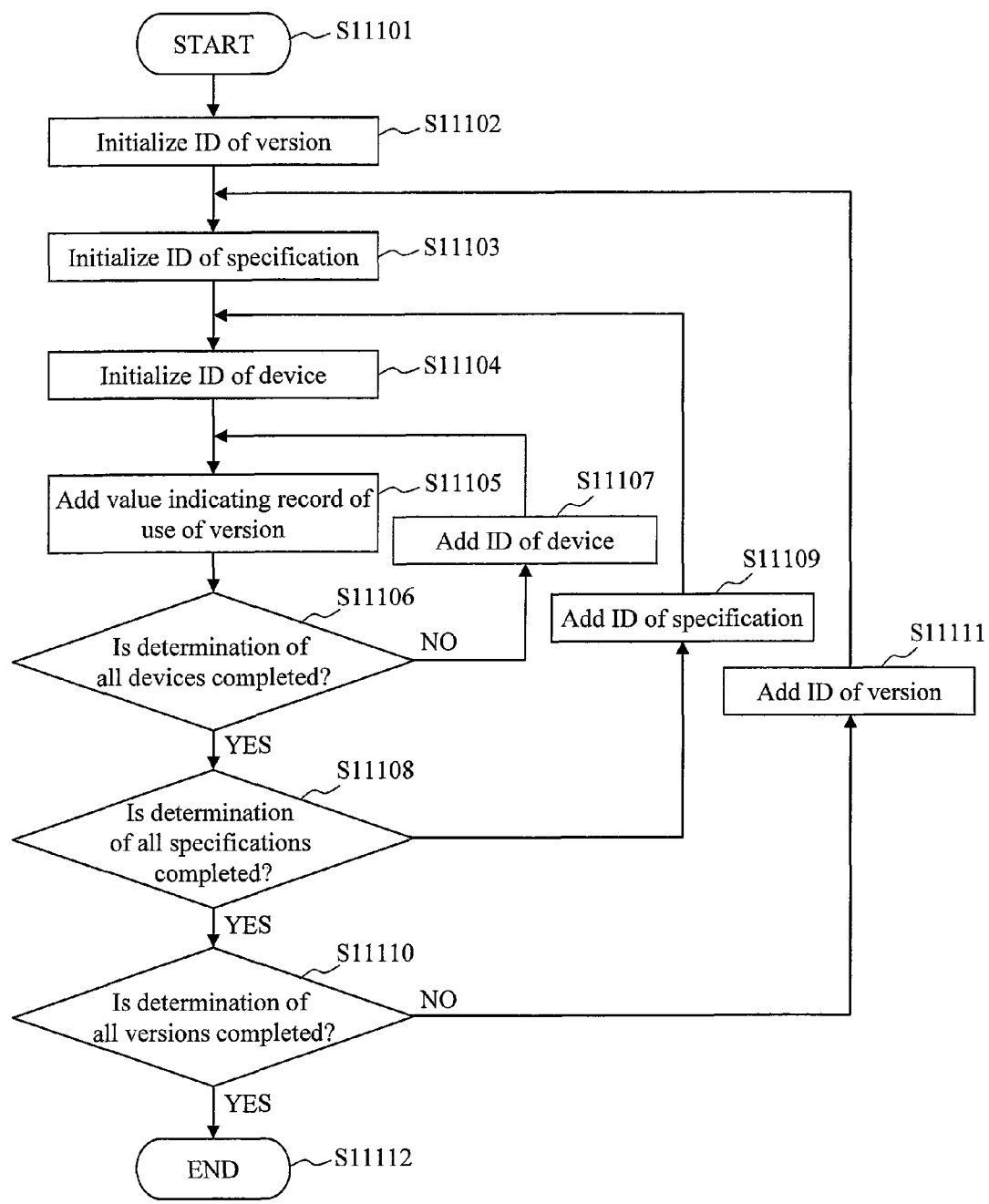
FIG. 6 is a flowchart illustrating an example of the flow of the process of a likelihood analysis processing unit of the likelihood analyzing unit of the software reuse support apparatus according to the embodiment of the invention.

FIG. 6 is a flowchart illustrating the flow of a process of analyzing the likelihood of a predetermined software component performed by the likelihood analysis processing unit 111 of the likelihood analyzing unit 11 according to the embodiment. The process starts from Step S11101. In Step S11102, the ID (identification number) of the version of a software component is initialized. In Step S11103, the ID (identification number) of a specification is initialized. In Step S11104, the ID (identification number) of a device is initialized. In Step S11105, it is checked whether the current version is used in the current device and the current specification. If it is determined that the current version is used in the current device and the current specification, the record of use of the version is added. In Step S11106, it is determined whether the determination of all the devices is completed. If it is determined that the determination of all the devices is completed, the process proceeds to Step S11108. On the other hand, if it is determined that the determination of all the devices is not completed, the process proceeds to Step S11107. In Step S11107, the ID of the device is added and the process proceeds to Step S11105. In Step S11108, it is determined whether the determination of all the specifications is completed. If it is determined that the determination of all the specifications is completed, the process proceeds to Step S11110. On the other hand, if it is determined that the determination of all the specifications is not completed, the process proceeds to Step S11109. In Step S11109, the ID of the specification is added, and the process proceeds to Step S11104. In Step S11110, it is determined whether the determination of all the versions is completed. If it is determined that the determination of all the versions is completed, the process proceeds to Step S11112. On the other hand, if it is determined that the determination of all the versions is not completed, the process proceeds to Step S11111. In Step S11111, the ID of the version is added and the process proceeds to Step S11103. In Step S11112, the process ends.

FIG. 7 is a diagram illustrating a likelihood table 1131 indicating the specification "the number of cylinders" of the software component SWC1 analyzed by the likelihood analysis processing unit 111 of the likelihood analyzing unit 11. The horizontal axis indicates a specification item, that is, the number of cylinders, and the vertical axis indicates the version number of the software component SWC1. In addition, the frequency of use of the version of the software component for the specification is written in the field where the horizontal axis and the vertical axis intersect each other. In the field, the record of use of the version is written on the upper side, and the likelihood is written on the lower side. For example, version 2.0 is not used when the number of cylinders is 4, is used six times when the number of cylinders is 6, and is used four times when the number of cylinders is 8. In addition, the likelihood of the version 2.0 is 0% when the number of cylinders is 4, is 60% when the number of cylinders is 6, and is 40% when the number of cylinders is 8. As such, the likelihood indicates the frequency distribution of the number of cylinders calculated for each version. That is, the likelihood indicates the distribution of the frequency of use of each version of the software component calculated for each number of cylinders.

Figure 8:
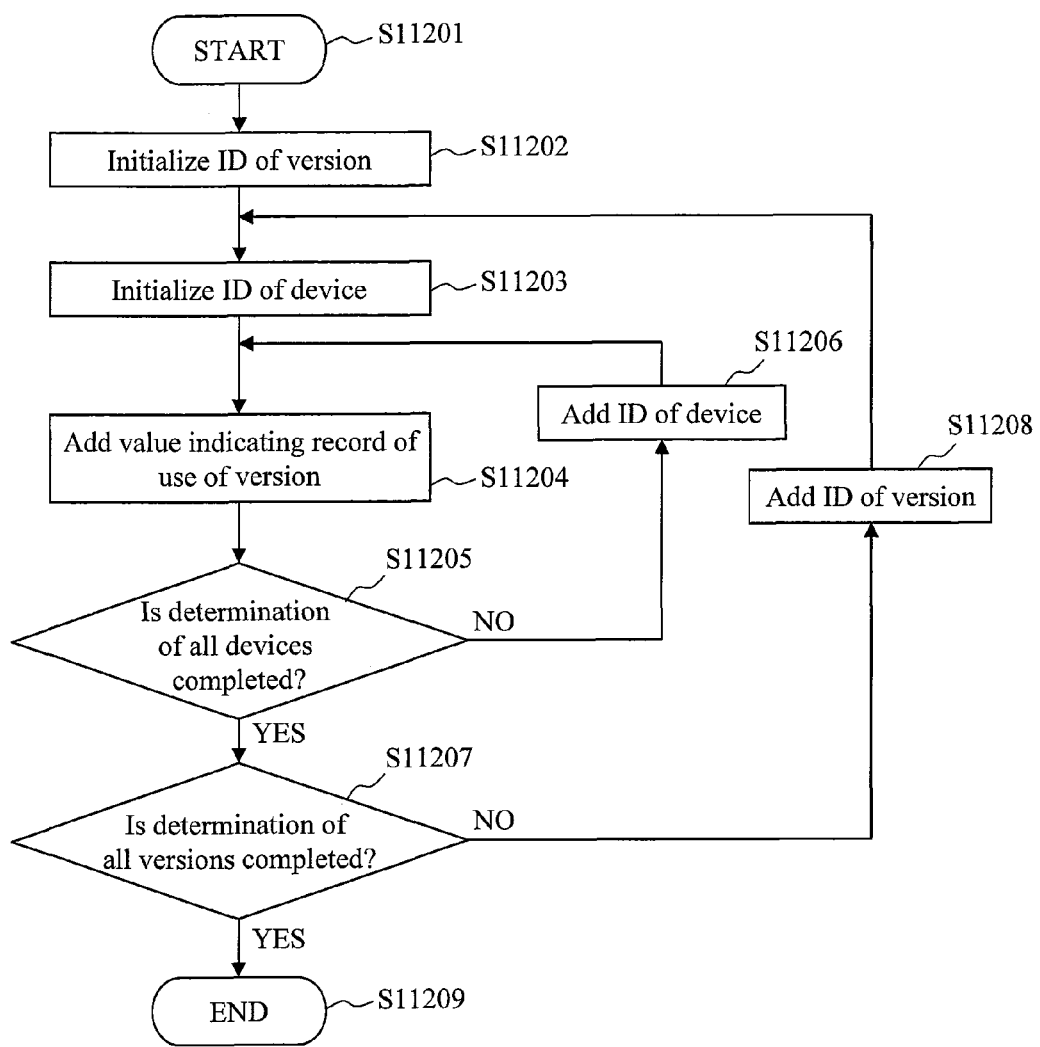
FIG. 8 is a flowchart illustrating an example of the flow of the process of a prior probability analyzing unit of the likelihood analyzing unit of the software reuse support apparatus according to the embodiment of the invention.
Figures 9, 10:
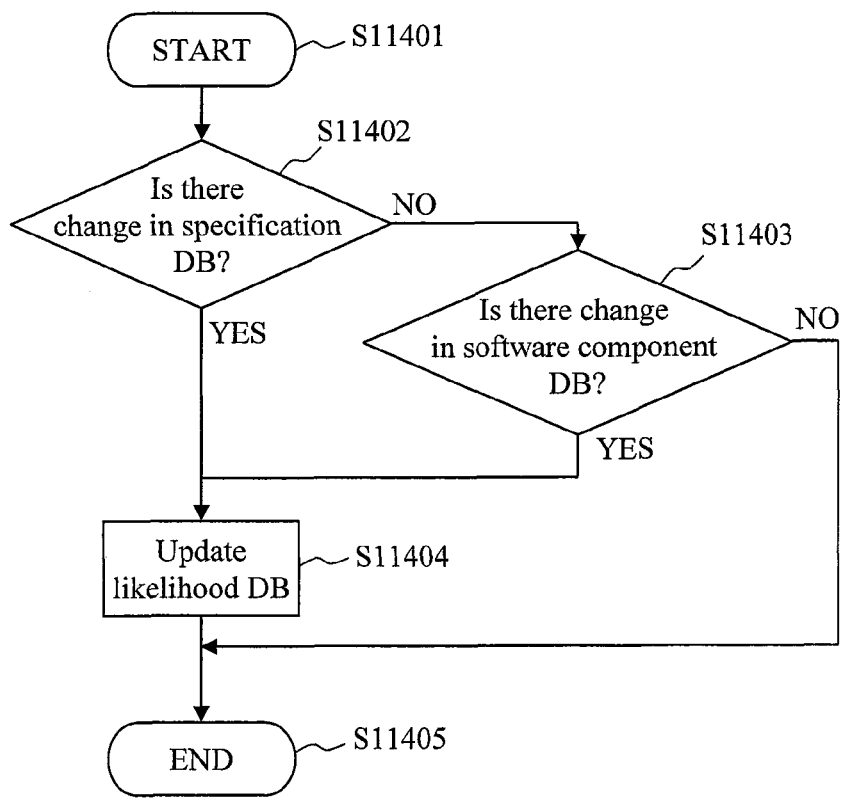
FIG. 9 is a diagram illustrating an example of the prior probability analysis result of the prior probability analyzing unit of the likelihood analyzing unit of the software reuse support apparatus according to the embodiment of the invention.
FIG. 10 is a flowchart illustrating an example of the flow of the process of a database update check unit of the likelihood analyzing unit of the software reuse support apparatus according to the embodiment of the invention.

FIG. 8 is a flowchart illustrating the flow of a process of analyzing the prior probability of a predetermined software component performed by the prior probability analyzing unit 112 of the likelihood analyzing unit 11. The process starts from Step S11201. In Step S11202, the ID (identification number) of the version of a software component is initialized. In Step S11203, the ID (identification number) of a device is initialized. In Step S11204, it is determined whether the current version is used in the current device. If it is determined that the current version is used in the current device, a value indicating the record of use of the version is added. In Step S11205, it is determined whether the determination of all the devices is completed. If it is determined that the determination of all the devices is completed, the process proceeds to Step S11207. On the other hand, if it is determined that the determination of all the devices is not completed, the process proceeds to Step S11206. In Step S11206, the ID of the device is added, and the process proceeds to Step S11204. In Step S11207, it is determined whether the determination of all the versions is completed. If it is determined that the determination of all the versions is completed, the process proceeds to Step S11209. On the other hand, if it is determined that the determination of all the versions is not completed, the process proceeds to Step S11208. In Step S11208, the ID of the version is added and the process proceeds to Step S11203. In Step S11209, the process ends. The process of analyzing the prior probability shown in FIG. 8 and the process of analyzing the likelihood shown in FIG. 6 differ from each other in that, in the process of analyzing the prior probability shown in FIG. 8, a process of calculating the ID number of the specification is removed.

FIG. 9 is a diagram illustrating a prior probability table 1132 of the software component SWC1 analyzed by the prior probability analyzing unit 112 of the likelihood analyzing unit 11. In the table, the left column indicates the version number of the software component SWC1, and the right column indicates the frequency of use of each version number. In addition, the upper side indicates the record of use of the version and the lower side indicates the prior probability.

For example, among the variations of the software component SWC1, Ver1.0 is used thirty times, Ver2.0 is used ten times, and Ver3.0 is used nine times. The prior probability of the Ver1.0 is 61%, and the prior probability of the Ver2.0 is 20%, and the prior probability of the Ver3.0 is 18%. As such, the prior probability indicates the distribution of the frequency of use of each version calculated for each software component.

According to the above-mentioned structure, it is possible to quantitatively evaluate whether the existing software component can be reused on the basis of the record of use of the existing software component.

FIG. 10 is a flowchart illustrating an example of the process of the database update check unit 114 of the likelihood analyzing unit 11. The process starts from Step S11401. In Step S11402, it is determined whether there is a change in the specification database 4. If it is determined that there is a change in the specification database, the process proceeds to Step S11404. On the other hand, if it is determined that there is no change in the specification database, the process proceeds to Step S11403. In Step S11403, it is determined whether there is a change in the software component database 5. If it is determined that there is a change in the software component database, the process proceeds to Step S11404. On the other hand, if it is determined that there is no change in the software component database, the process proceeds to Step S11405. In Step S11404, the likelihood analysis processing unit 111 and the prior probability analyzing unit 112 perform their processes, and the likelihood database 113 is updated. The process ends in Step S11405.

According to the above-mentioned structure, for example, it is not necessary to analyze the likelihood of various kinds of many existing control software items and software components, for example, several hundreds of existing control software items and several thousands of software components every time. Therefore, it is possible to perform a reusable software search process at a high speed.

Figure 11:
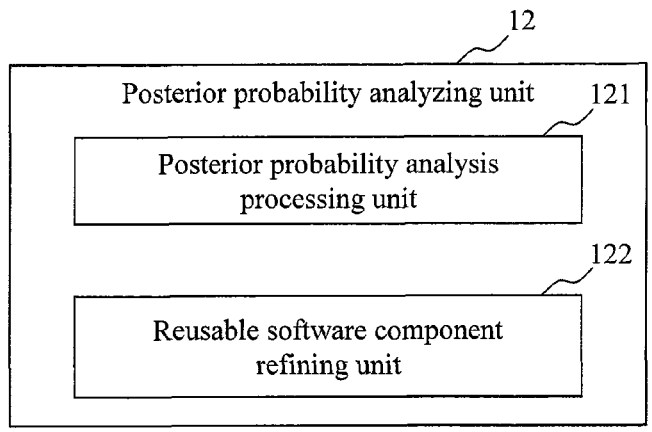
FIG. 11 is a diagram illustrating an example of the structure of a posterior probability analyzing unit of the reusable software component search device of the software reuse support apparatus according to the embodiment of the invention.

FIG. 11 is a diagram illustrating an example of the structure of the posterior probability analyzing unit 12. The posterior probability analyzing unit 12 includes a posterior probability analysis processing unit 121 and a reusable software component refining unit 122. The posterior probability analysis processing unit 121 will be described with reference to FIGS. 12 and 13. The reusable software component refining unit 122 will be described with reference to FIGS. 14 to 17.

Figure 12:
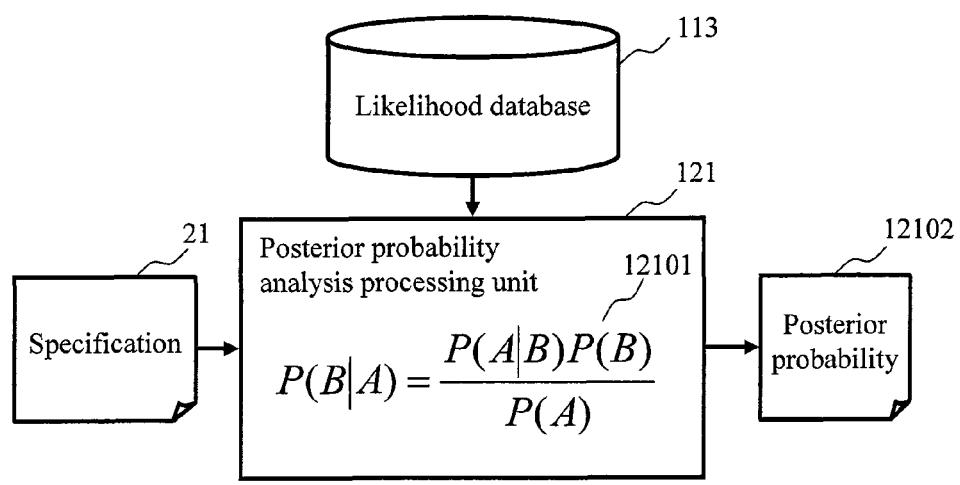
FIG. 12 is a diagram illustrating a basic expression used in a calculating operation of a posterior probability analysis processing unit of the posterior probability analyzing unit of the software reuse support apparatus according to the embodiment of the invention.

FIG. 12 is a diagram illustrating the outline of the process of the posterior probability analysis processing unit 121. The posterior probability analysis processing unit 121 receives likelihood data from the likelihood database 113 of the likelihood analyzing unit 11 and receives a specification 21 of a device to be newly developed or improved from the specification input unit 2. The likelihood database 113 will be described with reference to FIG. 13. The posterior probability analysis processing unit 121 calculates a posterior probability 12102 using an expression 12101. The expression 12101 is a basic expression for analyzing the posterior probability and is based on Bayes' theorem, which is one of the probability theories.

In the expression 12101, P(A) indicates the probability of an event A, P(B) indicates the probability of an event B, P(A|B) indicates the probability of the event A after the event B is generated, P(B|A) indicates the posterior probability of the event B after the event A is generated. It is assumed that the event A indicates that the specification 21 is selected in all of the previous devices and the event B indicates that a predetermined version of the software component is used in all of the previous control software. In this case, P(A) indicates the probability that the specification 21 will be selected in all of the previous devices and P(B) indicates the probability that a predetermined version of the software component will be used in all of the previous control software, that is, the prior probability 1132 (FIG. 9). In addition, P(A|B) indicates the probability that the specification of a device corresponding to the control software which uses a predetermined version of the previous software component will be the specification 21, that is, the likelihood 1131 (FIG. 7) of the specification 21. P(B|A) indicates the probability that a predetermined version of the software component will be reused in the control software of the device with the specification 21 to be newly developed. Since P(A), P(B), and P(A|B) have been known or can be calculated, P(B|A) can also be calculated. Therefore, it is possible to quantitatively calculate the reusability of a predetermined version of a software component.

In this embodiment, for simplicity of description, P(B) indicates the prior probability 1132. However, the posterior probability estimated after specifications other than the specification 21 are determined may be used as an input. In this case, it is possible to estimate the reusability with high accuracy since the influence of a plurality of specifications is considered.

Figure 13:
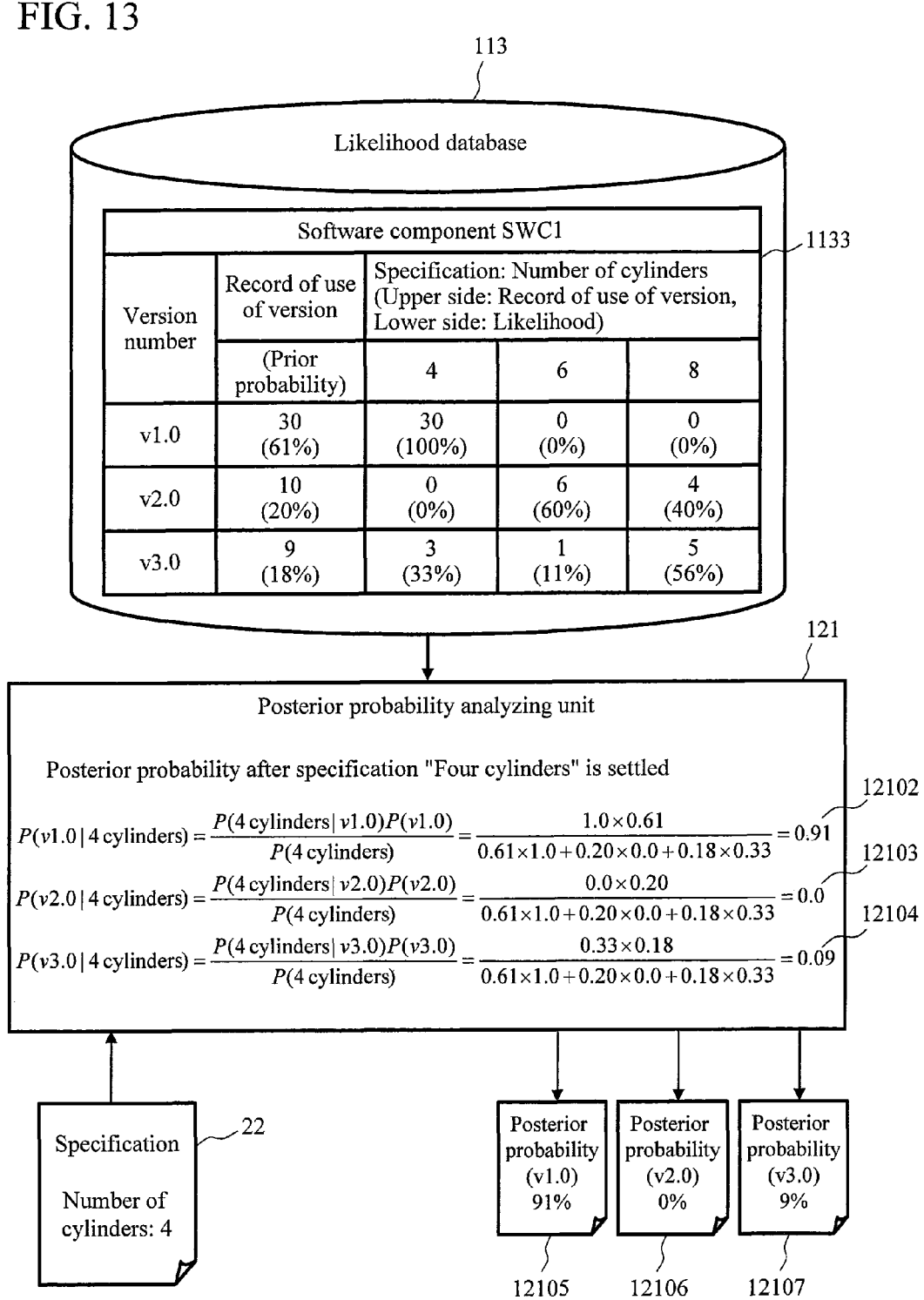
FIG. 13 is a diagram illustrating an example of the analysis process of the posterior probability analysis processing unit of the posterior probability analyzing unit of the software reuse support apparatus according to the embodiment of the invention.

FIG. 13 is a diagram illustrating an example of the calculation of the posterior probability by the posterior probability analysis processing unit 121 of the posterior probability analyzing unit 12. The likelihood database 113 stores likelihood data 1133. The likelihood data 1133 is a combination of the calculated prior probability table 1132 (FIG. 9) and likelihood table 1131 (FIG. 7). Since "the number of cylinders"=4 is input as a specification 22, the posterior probability is calculated after a specification "4 cylinders" is settled. An expression 12102 is for calculating the posterior probability of Ver1.0, an expression 12103 is for calculating the posterior probability of Ver2.0, and an expression 12104 is for calculating the posterior probability of Ver3.0. As a representative example, the calculation of the posterior probability of Ver1.0 by the expression 12102 will be described.

In the expression 12102, the posterior probability P(v1.0|4 cylinders) that the software component SWC1 "Ver1.0" will be reused after the specification "4 cylinders" is settled is calculated. The numerator of the expression 12102 is the product of the probability P(4 cylinders|ver1.0) that the specification will be "4 cylinders" when the software component Ver1.0 is used in the existing control software and the probability P(ver1.0) that the software component Ver1.0 will be selected in the existing control software. The probability P(4 cylinders|ver1.0) is 100% and the probability P(ver1.0) is 61%. Therefore, the numerator of the expression 12102 is 1.0×0.6.

The denominator of the expression 12102 is the probability that the specification will be "4 cylinders" in all of the existing devices. This is the sum of the products of the prior probability of each version and the likelihood that the specification will "4 cylinders" for each version.

As a result, the posterior probability 12105 of Ver1.0 is P(Ver1.0|4 cylinders)=91%. Similarly, the posterior probability 12106 of Ver2.0 is P(Ver2.0|4 cylinders)=0%. The posterior probability 12107 of Ver3.0 is P(Ver3.0|4 cylinders)=9%.

Figure 14:
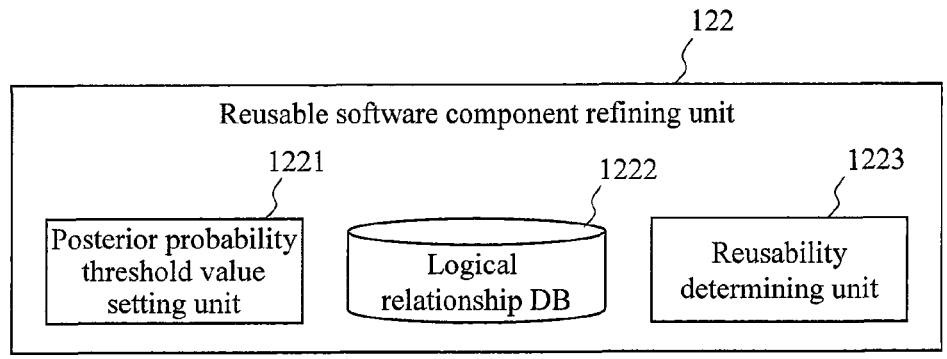
FIG. 14 is a diagram illustrating an example of the structure of a reusable software component refining unit of the posterior probability analyzing unit of the software reuse support apparatus according to the embodiment of the invention.

FIG. 14 is a diagram illustrating an example of the structure of the reusable software component refining unit 122 of the posterior probability analyzing unit 12. The reusable software component refining unit 122 includes a posterior probability threshold value setting unit 1221 that sets a threshold value for automatically determining the reuse of the existing software component, a logical relationship database 1222 that stores the logical relationship between the existing software components, and a reusability determining unit 1223 that determines reusability on the basis of the threshold value and the logical relationship.

Figure 15:
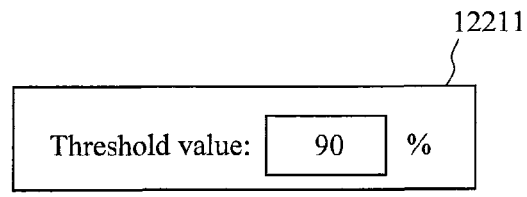
FIG. 15 is a diagram illustrating an example of a setting screen of a posterior probability threshold value setting unit in the reusable software component refining unit of the posterior probability analyzing unit of the software reuse support apparatus according to the embodiment of the invention.

FIG. 15 is a diagram illustrating a setting screen 12211 of the posterior probability threshold value setting unit 1221 in the reusable software component refining unit 122 of the posterior probability analyzing unit 12. The user sets the threshold value on the setting screen 12211. As shown in FIG. 13, the posterior probabilities analyzed by the posterior probability analysis processing unit 121 have small and large values. It may be determined that the version with a high posterior probability can be reused and the version with a low posterior probability cannot be reused. In this embodiment, if the posterior probability is less than the threshold value, the software component is automatically reused. In the example shown in FIG. 15, 90% is set as the threshold value.

According to the above-mentioned structure, even in the system including several thousands of software components, it is possible to automatically determine whether the software components can be reused by comparing the posterior probability with the threshold value. Therefore, it is possible to effectively develop new software using the existing software components.

Figure 16:
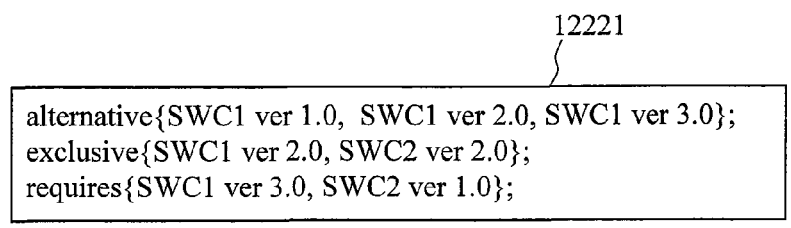
FIG. 16 is a diagram illustrating an example of the structure of a logical relationship database in the reusable software component refining unit of the posterior probability analyzing unit of the software reuse support apparatus according to the embodiment of the invention.

FIG. 16 is a diagram illustrating an example of the logical relationship 12221 between the software components stored in the logical relationship database 1222 of the reusable software component refining unit 122 of the posterior probability analyzing unit 12. For example, a selective relationship, an exclusive relationship, and a dependence relationship are stored as the logical relationship 12221. The selective relationship means that any element can be selected from a set of at least three elements. The exclusive relationship means that, when one element in a set of two elements is selected, the other element cannot be selected. The dependence relationship means that, when one element is selected from a set of a plurality of elements, another specific element needs to be selected. FIG. 16 is a diagram illustrating an example of the selective relationship, the exclusive relationship, and the dependence relationship. These relationships are freely determined by the user.

In the exclusive relationship, when one of the Ver2.0 of the existing software component SWC1 and the Ver2.0 of the existing software component SWC2 is selected, the other version is automatically excluded from the selection list. According to the above-mentioned structure, even in the system including several thousands of software components, it is possible to automatically determine whether the software components can be reused on the basis of the logical relationship between the software components. Therefore, it is possible to effectively develop new software using the existing software components.

Figure 17:
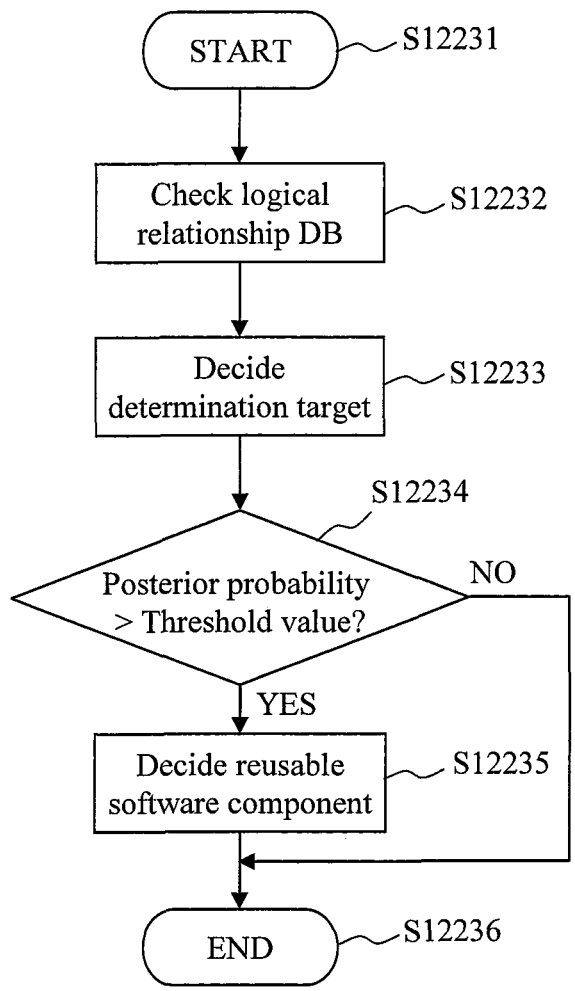
FIG. 17 is a flowchart illustrating an example of the flow of the process of a reusability determining unit in the reusable software component refining unit of the posterior probability analyzing unit of the software reuse support apparatus according to the embodiment of the invention.

FIG. 17 is a flowchart illustrating the flow of the process of the reusability determining unit 1223 of the reusable software component refining unit 122 of the posterior probability analyzing unit 12. The process starts from Step S12231. In Step S12232, the logical relationship database 1222 is checked. An example of the logical relationship database 1222 is shown in FIG. 16. In Step S12233, a software component satisfying the logical relationship set by the logical relationship database 1222 is selected. In this way, the software component satisfying the logical relationship is set to a determination target. In Step S12234, it is determined whether the posterior probability of the determination target is more than the threshold value shown in FIG. 15. If it is determined that the posterior probability is more than the threshold value, the process proceeds to Step S12235. If not, the process proceeds to Step S12236. In Step S12235, the software component, which is the determination target, is set as a reusable component. In Step S12236, the process ends. However, when there are a large number of software components that are determined to be reusable, the threshold value shown in FIG. 15 may be changed.

FIG. 18 is a diagram illustrating an example of a specification selection screen 231 of the specification input unit 2 operated by the user. The user operates a pointer 2311 to interactively select the specifications of a device to be newly developed or improved. On the specification selection screen 231, Japan (JP) is selected as a destination, 6 is selected as the number of cylinders, an MPI (multi-port injection) type is selected as the fuel injection type, and a transmission type is not selected.

FIG. 19 is a diagram illustrating an example of a software component selection screen 31 of the reuse software output unit 3 operated by the user. The user operates a pointer 311 to determine the version of the software component to be reused. In this example, the version in which the posterior probability 12105 is more than the threshold value (in setting screen 12211 in FIG. 15) is automatically selected on the software component selection screen 31. For the software component SWC1, Ver1.0 is selected. However, the version of the software component SWC2 has not been selected by the user.

The specification selection screen 231 shown in FIG. 18 and the software component selection screen 31 shown in FIG. 19 may be displayed on the same screen. When they are displayed on the same screen, it is possible to interactively check a variation in the posterior probability of the software component due to the selection of the specifications.

Figure 20:
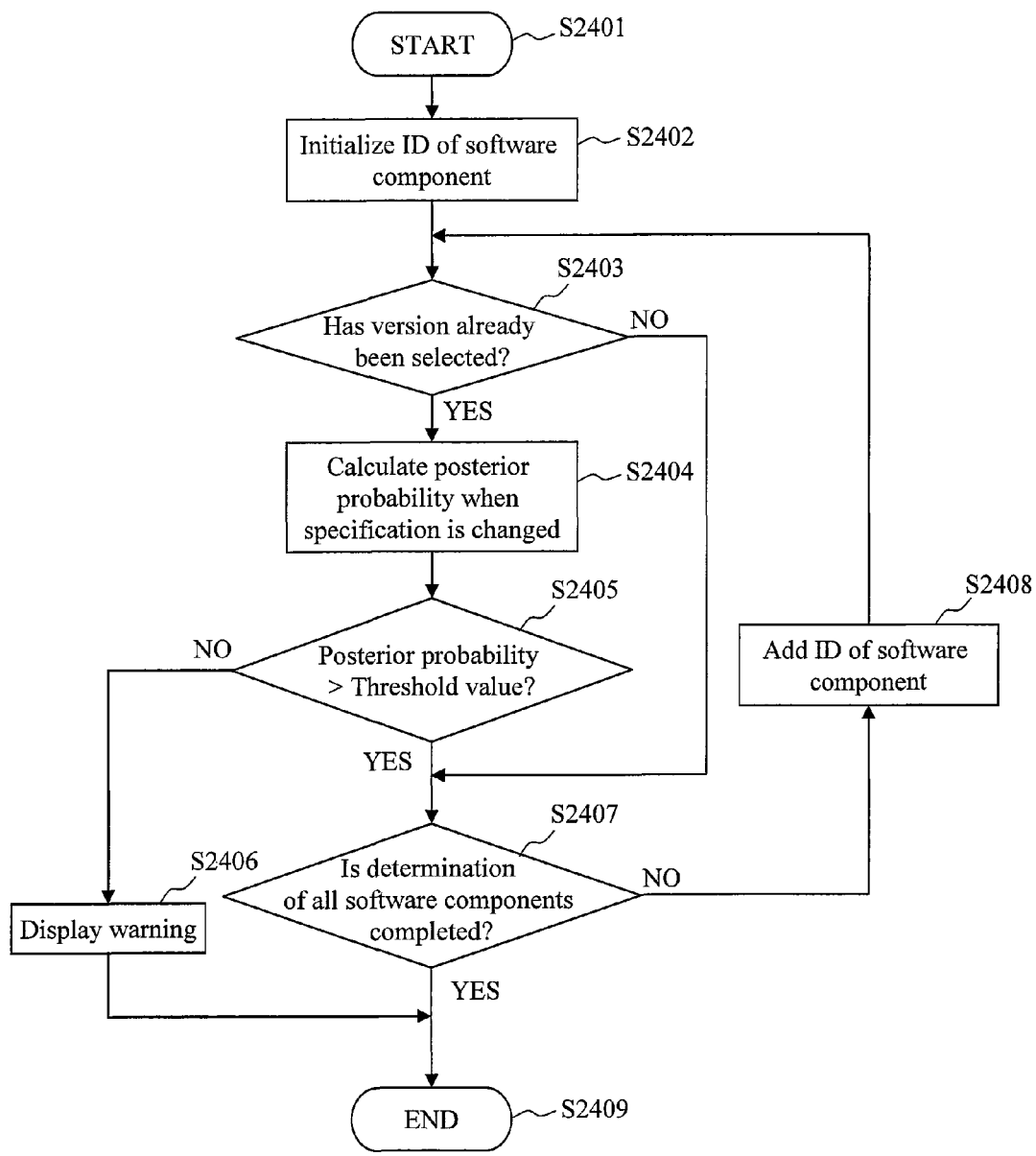
FIG. 20 is a flowchart illustrating an example of the flow of a specification change warning process of the specification input unit of the software reuse support apparatus according to the embodiment of the invention.

FIG. 20 is a flowchart illustrating the flow of a specification change warning process of the specification input unit 2. A warning display determining process for a predetermined specification item starts from Step S2401. In Step S2402, the ID (identification number) of a software component (SWC) is initialized. In Step S2403, it is determined whether the version number has already been selected on the software component selection screen 31 (FIG. 19). If it is determined that the version number has already been selected on the software component selection screen, the process proceeds to Step S2404. If not, the process proceeds to Step S2407. In Step S2404, the posterior probability when the currently selected specification is changed is calculated. In Step S2405, it is determined whether the posterior probability calculated in Step S2404 is more than the threshold value (in setting screen 12211 in FIG. 15). If it is determined that the posterior probability is more than the threshold value, the process proceeds to Step S2407. If not, the process proceeds to Step S2406. In Step S2406, a warning is displayed on the specification selection screen 231 (FIG. 18). In Step S2407, it is determined whether the determination of all the software components is completed. If it is determined that the determination of all the software components is completed, the process proceeds to Step S2409. If not, the process proceeds to Step S2408. In Step S2408, the ID of the software component is added and the process proceeds to Step S2403. In Step S2409, the process ends.

Figure 21:
FIG. 21 is a diagram illustrating an example of a specification change warning display on the specification selection screen of the specification input unit of the software reuse support apparatus according to the embodiment of the invention.

FIG. 21 is a diagram illustrating an example of a specification selection screen 25 on which a specification change warning is displayed. In this example, the specification selection screen 25 is similar to the specification selection screen 231 shown in FIG. 18 except that a warning mark 251 is displayed in the item indicating the number of cylinders. When the specification "the number of cylinders" is changed, the posterior probability of the software component whose reusability has been determined is less than the threshold value.

According to the above-mentioned structure, it is possible to clarify the specification which needs to be determined again in the software component whose reusability has been determined when the determined specification is changed, and warn the user that development needs to be performed again due to the change in specification.

The embodiment of the invention has been described above, but the invention is not limited to the above-described embodiment. It will be understood by those skilled in the art that various modifications and changes of the invention can be made without departing from the scope and spirit of the invention.

The invention can be applied to software control software having a plurality of existing control software components.

REFERENCE NUMERALS

1: reusable software component search device
2: specification input unit
3: reusable software component display unit
4: specification database
5: software component database
11: likelihood analyzing unit
12: posterior probability analyzing unit

What is claimed is:

1. A software component reuse support method executable by an arithmetic device of supporting the use of existing software components when control software to be developed is created, using a specification database that stores the specifications of an existing device, a software component database that stores software components used in the control software of the existing device and the versions of the software components, an input device, and the arithmetic device, comprising:

a likelihood analyzing step of allowing the arithmetic device to calculate a likelihood indicating the distribution of the frequency used in each specification for each version of the software component, on the basis of the specifications of the device stored in the specification database and the software components and the versions of the software components stored in the software component database;

a prior probability analyzing step of allowing the arithmetic device to calculate a prior probability indicating the distribution of the frequency used in each version for each software component, on the basis of the specifications of the device stored in the specification database and the software components and the versions of the software components stored in the software component database;

a specification input step of inputting the specifications of a device to be developed through the input device;

a posterior probability analyzing step of allowing the arithmetic device to calculate a posterior probability indicating the reusability of each version of the existing software component for each specification of the device to be developed, on the basis of the specifications of the device to be developed, the likelihood, and the prior probability; and a software component selecting step of allowing the arithmetic device to select the version of the software component with a high posterior probability as a software component which can be reused for the control software of the device to be developed.

2. The software component reuse support method according to claim 1,
wherein, in the posterior probability calculating step, when the likelihood is $P(A|B)$, the prior probability is $P(B)$, the posterior probability is $P(B|A)$, the probability that the specifications of the device to be developed will be selected from all the existing devices is $P(A)$, the posterior probability is calculated by an expression $P(B|A)=P(A|B) P(B)/P(A)$.

3. The software component reuse support method according to claim 1,
wherein the software component selecting step compares the posterior probability calculated in the posterior probability analyzing step with a predetermined threshold value and selects the version of the software component with a posterior probability greater than the threshold value as a reusable software component.

4. The software component reuse support method according to claim 1, further comprising:
a step of establishing a logical relationship for restricting the selection between the software components,
wherein the software component selecting step selects the software component with a version satisfying the logical relationship among the versions of the software components with a high posterior probability as a reusable software component.

5. The software component reuse support method according to claim 4,
wherein the logical relationship includes at least one of an exclusive relationship in which, when the version of one software component of the versions of two software components is selected, the version of the other software component cannot be selected and a dependence relationship in which, when the version of one software component is selected among the versions of a plurality of software components, the version of another specific software component needs to be selected.

6. The software component reuse support method according to claim 1,
wherein the device is an engine control device,
the specifications of the device are the specifications of the engine control device, and
the control software is engine control software.

7. A software component reuse support method executable by an arithmetic device of supporting the use of existing software components when control software to be developed is created, using a specification database that stores the specifications of an existing device, a software component database that stores software components used in the control software of the existing device and the versions of the software components, and a computer, comprising:
a likelihood analyzing step of calculating a likelihood indicating the distribution of the frequency used in each specification for each version of the software component, on the basis of the specifications of the device stored in the specification database, and the software components and the versions of the software components stored in the software component database;
a prior probability analyzing step of calculating a prior probability indicating the distribution of the frequency of use of each version for each software component, on the basis of the specifications of the device stored in the specification database and the software components and the versions of the software components stored in the software component database;
a specification input step of inputting the specifications of a device to be developed; and
a posterior probability analyzing step of calculating a posterior probability indicating the reusability of each version of the existing software component for each specification of the device to be developed,
wherein, in the posterior probability calculating step, when the likelihood is P(A|B), the prior probability is P(B), the posterior probability is P(B|A), the probability that the specifications of the device to be developed will be selected from all the existing devices is P(A), the posterior probability is calculated by an expression P(B|A)=P(A|B) P(B)/P(A).

8. The software component reuse support method according to claim 7, further comprising:
a step of establishing a logical relationship for restricting the selection between the software components, and
a software component selecting step for selecting the software component with a version satisfying the logical relationship among the versions of the software components with a high posterior probability as a reusable software component.

9. The software component reuse support method according to claim 8,
wherein the logical relationship includes at least one of an exclusive relationship in which, when the version of one software component of the versions of two software components is selected, the version of the other software component cannot be selected and a dependence relationship in which, when the version of one software component is selected among the versions of a plurality of software components, the version of another specific software component needs to be selected.

10. The software component reuse support method according to claim 7,
wherein the device is an engine control device,
the specifications of the device are the specifications of the engine control device, and
the control software is engine control software.

11. A software component reuse support apparatus having a processor that supports the use of an existing software component when control software to be developed is created, comprising:
a specification database that stores the specifications of an existing device;
a software component database that stores software components used in the control software of the existing device and the versions of the software components;
an input device; and
a reusable software component search device that searches for a reusable software component from the software component database on the basis of the specifications of a device to be developed which is input through the input device,
wherein the reusable software component search device includes:
a likelihood analyzing unit that calculates a likelihood indicating the distribution of the frequency used in each specification for each version of the software component, on the basis of the specifications of the device stored in the specification database and the software components and the versions of the software components stored in the software component database, and calculates a prior probability indicating the distribution of the frequency of use of each version for each software component, on the basis of the specifications of the device stored in the specification database and the software components and the versions of the software components stored in the software component database; and
a posterior probability analyzing unit that calculates a posterior probability indicating the reusability of each version of the existing software component for each specification of the device to be developed, on the basis of the likelihood, the prior probability, and the specifications of the device to be developed which are input through the input device.

12. The software component reuse support apparatus according to claim 11,
wherein, when the likelihood is P(A|B), the prior probability is P(B), the posterior probability is P(B|A), the probability that the specifications of the device to be developed will be selected from all the existing devices is P(A), the posterior probability analyzing unit calculates the posterior probability using an expression P(B |A)=P(A|B) P(B)/P(A).

13. The software component reuse support apparatus according to claim 11,
wherein the reusable software component search device includes:
a logical relationship database that stores a logical relationship including at least one of an exclusive relationship in which, when the version of one software component of the versions of two software components is selected, the version of the other software component cannot be selected and a dependence relationship in which, when the version of one software component is selected among the versions of a plurality of software components, the version of another specific software component needs to be selected; and
a reusability determining unit that determines the version of the software component with a posterior probability greater than a predetermined threshold value among the software components satisfying the logical relationship stored in the logical relationship database to be a reusable software component in the control software of the device to be developed.

14. The software component reuse support apparatus according to claim 11,
wherein the device is an engine control device,
the specifications of the device are the specifications of the engine control device, and
the control software is engine control software.

15. A software component reuse support apparatus having a processor that supports the use of an existing software component when engine control software to be developed is created, comprising:
a specification database that stores the specifications of an existing engine control device;
a software component database that stores software components used in the control software of the existing engine control device and the versions of the software components;
an input device;
a display device; and
a reusable software component search device that searches for a reusable software component from the software component database on the basis of the specifications of an engine control device to be developed which is input through the input device,
wherein the reusable software component search device includes:
a likelihood analyzing unit that calculates a likelihood indicating the distribution of the frequency used in each specification for each version of the software component, on the basis of the specifications of the engine control device stored in the specification database and the software components and the versions of the software components stored in the software component database, and calculates a prior probability indicating the distribution of the frequency of use of each version for each software component, on the basis of the specifications of the engine control device stored in the specification database and the software components and the versions of the software components stored in the software component database; and
a posterior probability analyzing unit that calculates a posterior probability indicating the reusability of each version of the existing software component for each specification of the engine control device to be developed, on the basis of the likelihood, the prior probability, and the specifications of the engine control device to be developed which are input through the input device, and
when the likelihood is P(A|B), the prior probability is P(B), the posterior probability is P(B|A), the probability that the specifications of the engine control device to be developed will be selected from all the existing engine control devices is P(A), the posterior probability analyzing unit calculates the posterior probability using an expression P(B|A)=P(A|B)·P(B)/P(A).

16. The software component reuse support apparatus according to claim 15,
wherein the reusable software component search device is a computer.

17. The software component reuse support apparatus according to claim 15,
wherein the reusable software component search device includes:
a logical relationship database that stores a logical relationship including at least one of an exclusive relationship in which, when the version of one software component of the versions of two software components is selected, the version of the other software component cannot be selected and a dependence relationship in which, when the version of one software component is selected among the versions of a plurality of software components, the version of another specific software component needs to be selected; and
a reusability determining unit that determines the version of the software component with a posterior probability greater than a predetermined threshold value among the versions of the software components satisfying the logical relationship stored in the logical relationship database to be a reusable software component in the control software of the engine control device to be developed.

18. The software component reuse support apparatus according to claim 15,
wherein the display apparatus displays a software component selection screen, which is an operation screen that can be operated by a user, and
the version number of each software component and the posterior probability of each version are displayed on the software component selection screen.

19. The software component reuse support apparatus according to claim 15,
wherein the display apparatus displays a specification selection screen, which is an operation screen that can be operated by a user, and
a choice for each specification is displayed on the specification selection screen such that the user can change the choice for the version.

20. The software component reuse support apparatus according to claim 19,
wherein, when the user changes the choice on the specification selection screen, the posterior probability is recalculated, and
when the recalculated posterior probability is less than the predetermined threshold value, a warning is displayed.

* * * * *